March 3, 1959     R. S. COFFMAN     2,875,921
SAFETY DEVICE EQUIPPED WITH A RUPTURE UNIT
Filed Aug. 5, 1954     3 Sheets-Sheet 1
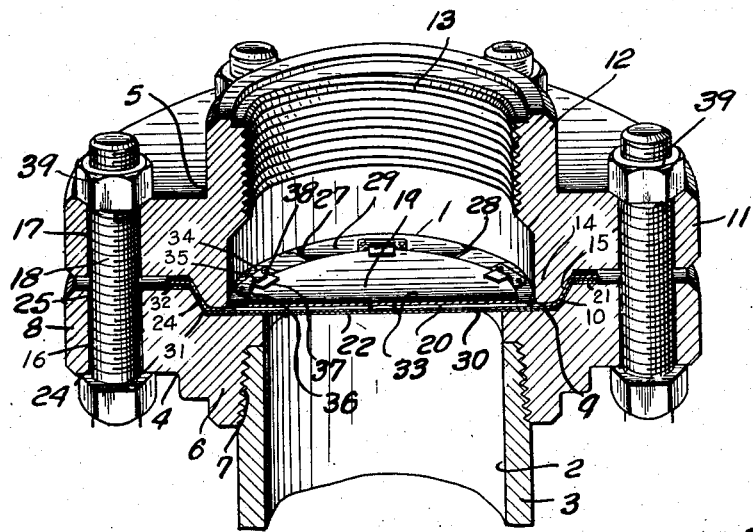
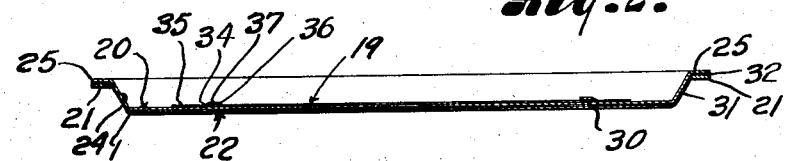
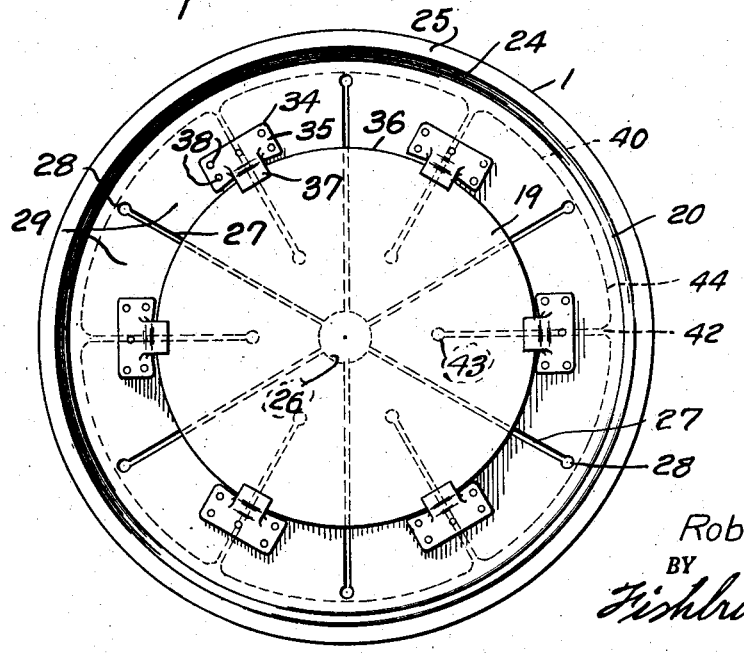
INVENTOR.
Robert S. Coffman.
BY
ATTORNEYS.

March 3, 1959    R. S. COFFMAN    2,875,921
SAFETY DEVICE EQUIPPED WITH A RUPTURE UNIT
Filed Aug. 5, 1954    3 Sheets-Sheet 2

INVENTOR.
Robert S. Coffman.
BY
ATTORNEYS.

March 3, 1959 R. S. COFFMAN 2,875,921
SAFETY DEVICE EQUIPPED WITH A RUPTURE UNIT
Filed Aug. 5, 1954 3 Sheets-Sheet 3

INVENTOR.
Robert S. Coffman.
BY
Fishburn & Mullendore
ATTORNEYS.

United States Patent Office 2,875,921
Patented Mar. 3, 1959

2,875,921

SAFETY DEVICE EQUIPPED WITH A RUPTURE UNIT

Robert S. Coffman, Kansas City, Mo., assignor to Black, Sivalls & Bryson, Inc.

Application August 5, 1954, Serial No. 448,081

4 Claims. (Cl. 220—89)

This invention relates to a safety device equipped with a rupture unit for protecting equipment operating under differential internal and external pressures, and more particularly to a rupture element for application on low pressure equipment that could not previously be protected with safety devices having a rupture unit.

Thus the principal object of this invention is to provide a rupture element having support under normal working pressures and yieldable under a predetermined pressure differential.

A further object of the invention is to provide a safety device for use in systems containing highly corrosive chemicals, such as sulphuric acid, fuming nitric acid, fluorine, chlorine, hydrochloric acid and the like.

Other objects of the invention are to provide a safety device having a relatively thin non-corrosive pressure sealing element isolating and protecting a supporting element and a control element, the latter elements being arranged to give way under a predetermined pressure differential acting on the respective sides of the pressure sealing element; to provide a safety device of this character adapted to operate under vacuum pressures; to provide a safety device that permits full opening of the relief outlet with which it is associated; to provide a safety device wherein the pressure sealing element also serves as a corrosive seal; and to provide a structure wherein the pressure and/or corrosive seal is not a critical factor in the rupture pressure.

It is also an object of the invention to provide a safety device which may be used to relieve both vacuum and pressure.

In accomplishing these and other objects of the present invention hereinafter pointed out, I have provided improved structure the preferred forms of which are illustrated in the accompanying drawings wherein:

Fig. 1 is a vertical section through a safety device equipped with a rupture unit constructed in accordance with the present invention.

Fig. 2 is an enlarged diametrical section through the rupture unit of Fig. 1.

Fig. 3 is a top plan view of the rupture unit.

Figure 4:
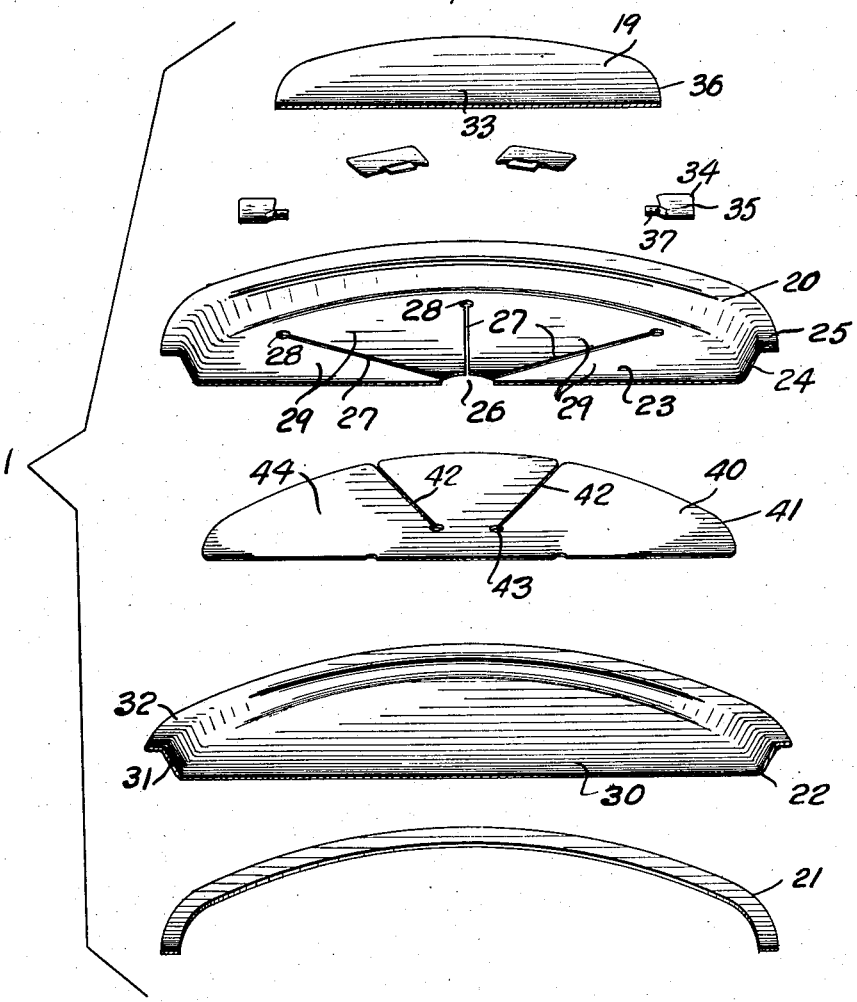
Fig. 4 is a perspective view of the parts of the rupture unit shown in diametrical section and in spaced apart relation to better illustrate the construction, and showing a protector for the pressure sealing element.

Referring more in detail to the drawings:

1 designates a rupture unit constructed in accordance with the present invention and mounted over a relief opening 2 in a connection 3 with an appliance or vessel, containing a pressure medium under relatively low differentials. The rupture unit 1 is retained in position by means of conventional clamping rings 4 and 5.

The clamping ring 4 is shown as having a collar portion 6 provided with internal threads or the like 7 for attachment to the fitting 3. The clamping ring 4 has a flange 8 provided with a recessed seat 9 encircling the relief opening 2 and which in turn is encircled by an outwardly tapering clamping face 10.

The clamping ring 5 also includes a flange portion 11 and a collar portion 12 that is concentric with the collar portion 6 and which forms an outlet 13 for the relief opening 2. The collar portion 12 has an annular clamping rib 14 provided with a tapered clamping face 15 and cooperating with the clamping face 10 to retain the rupture unit. The flange portions 8 and 11 have registering openings 16 and 17 for passing fastening devices such as bolts 18 to secure the clamping rings together.

The rupture unit 1 is best illustrated in Figs. 2, 3 and 4 and includes a control element 19, an outer and supporting element 20 and an inner retaining element 21 for a pressure sealing element 22, which also forms an isolating seal for the outer supporting and control elements as later described.

The supporting element 20 is formed of relatively light gauge flexible sheet material and shaped to include a substantially flat disk-portion 23 and an annular laterally flaring flange portion 24 substantially conforming in taper to the clamping faces 10 and 15 of the clamping rings previously described and which terminates in an annular laterally extending rim 25 adapted to be contained between the flange portions of the respective clamping rings 4 and 5. The disk portion 23 of the supporting element 20 has a central opening 26 and extending therefrom are radial slits 27 terminating short of the juncture of the flange portion 24 in apertures 28 whereby the disk portion is divided into a plurality of substantially triangular segments 29 that are adapted to flex outwardly under an excessive pressure and to bend along lines connecting the terminal apertures 28 of the respective slits as later described.

The pressure sealing element 22 conforms in shape with the supporting element 20 in that it includes a flat disk portion 30 encircled by an outwardly flaring flange portion 31 which terminates in an outwardly extending annular rim portion 32 whereby the pressure sealing element 22 and supporting element are nested together with the rim portion 32 in underlying contact with the rim 25 and the disk portion 30 in face contact with the disk portion 23 in covering relation with the apertures 28, opening 26 and slits 27. The rim portion 32 is clamped between the rim portion 25 of the supporting element and the retaining element 21.

The retaining element is of flat ring shape to conform with the rim portion 25 for protecting the rim of the pressure sealing element from distortion by the clamping rings.

The control element 19 includes a disk 33 that is preferably formed of thin light-gauge sheet material having a predetermined strength so that it does not bend under working pressures but holds the segments 29 flat. The control element 19 is retained in contact with the segments 29 of the supporting element by tabs or clips 34 having plate portions 35 attached to the segments 29 at the peripheral edge of the control element 19. Extending from the plate portions of the clips and over the marginal edge 36 of the control element are tongues 37 which are the determining factor at which the device functions to relieve excessive pressures, for example, the thickness and number of the clips may be varied to obtain various bursting pressures. The plate portions 35 of the tabs or clips 34 are secured to the base portions of the segments by suitable means such as soldering, spot welding or the like as indicated at 38 (Fig. 1).

In assembling the parts which constitute the rupture unit, the control element 19 is placed within the supporting element with a side face thereof seated concentrically upon the disk portion 23 of the supporting element 20. The tabs or clips 34 are then placed in position about the periphery of the control element and secured to the segments 29 of the supporting element 20 by spot welding the plate portions 35 thereof to the segments 29 as indicated at 38 with the tongue portions 37 overlapping the marginal portion of the disk 33.

The supporting element 20 and pressure sealing element 22 are nested with the outer rims thereof in contact, after which the retaining ring 21 which constitutes a bottom supporting element is applied against the rim of the pressure sealing element and the parts are secured together at the marginal edges by spot welding together the edges of the rim 25 and ring 21.

Units thus constructed and assembled may be furnished to rupture under any required pressure differential by selecting the proper gauge, strength and kind of material for a given diameter or relief opening which, of course, governs the diametrical sizes of the respective parts of the rupture units.

The assembled rupture unit 1 is installed by removing the upper clamping flange 5 from the lower clamping flange 4 and placing the unit 1 with the outer marginal portion of the pressure sealing element 22 in seating contact with the seat 9 and the flaring flange portion 31 thereof in contact with the tapering clamping face 10 with the rim portions 25 and 32 and the retaining element overlying the upper face of the flange portion 8. The clamping ring 5 is then applied with the annular rib portion 14 thereof engaging within the supporting element 20 with the clamping face 15 thereof in contact with the tapered flange portion 23 as shown in Fig. 1. The bolts 18 are then applied and the nuts 39 tightened so that the clamping faces 10 and 15 securely grip and seal about the tapered portion of the rupture unit.

Under normal working pressures, the rupture unit 1 appears as illustrated in Fig. 1, however, when the pressure in the relief opening 2 begins to rise above the safe working pressure, the tongue portions 37 of the clips give way under pressure which ruptures the pressure releasing element, and at the predetermined calculated pressure, when the control element is freed, the escaping pressure bends the segments 29 outwardly and upwardly to provide a full relief of the pressure fluid. A full opening of the rupture unit is thus effected and the release of the pressure sufficiently rapid to protect the equipment on which the safety device is installed. It is obvious that the tongue portion of any one tab is free and independent of the tongue portion of the other tabs, and that they are adapted to slide off the marginal portion of the disk member for releasing the disk member when the yieldable portions begin to yield under the rise of pressure.

After rupture of the unit 1, it is replaced with a new unit having the required rupture pressure.

In the parts shown in Fig. 4, an additional disk element 40 is inserted between the supporting element 20 and the pressure sealing element 22 to protect the pressure sealing element 22 at the points of the slits 27. The protector 40 is shown as a disk-like shape of sufficient diameter to cover the apertures 28 and the size is preferably such that the peripheral edge 41 is slightly less in diameter than diameter at the juncture of the disk portion 23 with the tapering flange portion 24 of the supporting element. The protector 40 is provided with radial slits 42 that are arranged intermediate the slits 27 and which extend from the peripheral edge 41 inwardly to terminate short of the opening 26 in apertures 43.

Figure 6:
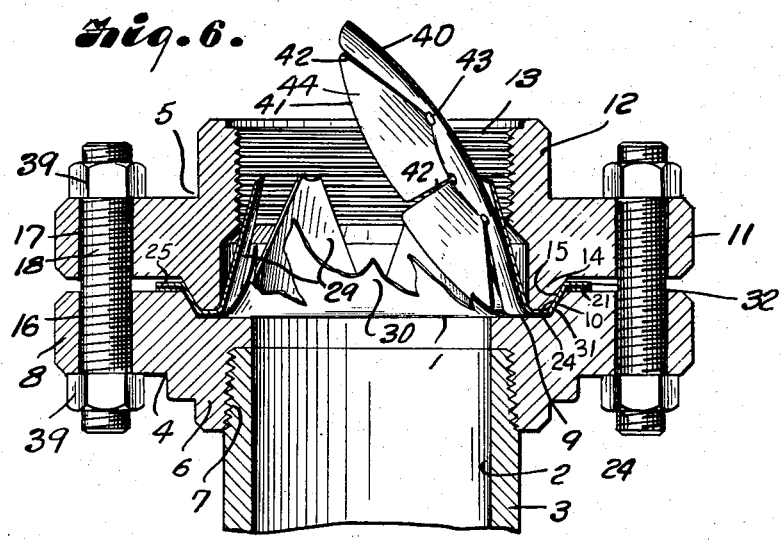
Fig. 6 is a vertical section similar to Fig. 1 showing a further modified form of the invention showing the rupture unit relieving pressure.

In functioning of the rupture unit equipped with the protector, the pressure acting on the sealing element 22 acts to bulge the protector 40 outwardly against the segmental portions 29 of the supporting element 20 with the segmental portions 44 of the protector bending on lines connecting the apertures 43 so that the protector element passes through the opening that is formed by opening-up of the segmental portions of the supporting element as shown in Fig. 6.

Figure 5:
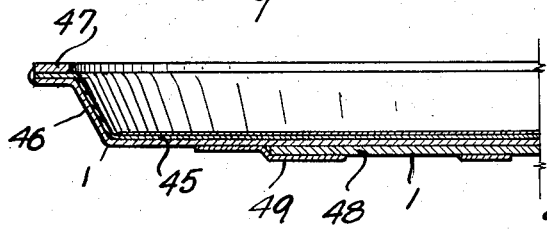
Fig. 5 is an enlarged fragmentary section through a modified form of unit arranged to operate under vacuum pressures.

The form of the invention shown in Fig. 5 provides a rupture unit capable of functioning under vacuum pressures. The parts are exactly the same as illustrated in the above described form of the invention with the exception that they are reversed so that the pressure sealing element 45 is placed within the supporting element 46 and the retaining ring 47 is placed over the marginal rim of the pressure sealing element 45 and secured to the rim of the supporting element by spot welding about the peripheries thereof. Also, in this form of the invention, the control element 48 is attached to the inner supporting element 46 by tabs 49 similar to the tabs 34 previously described.

The form of invention shown in Fig. 5 is mounted between the clamping rings 4 and 5 of the safety device in exactly the manner as above described. There can be no error in proper placement because the parts will not fit together unless the tapered periphery of the rupture unit is in proper relation with the clamping faces of the clamping rings.

In case a vacuum should occur within the vessel, the external pressure acts upon the control and supporting element 46 and will move them inwardly until the parts function to provide a full opening for inlet of external pressure to relieve the vacuum in the vessel or other appliance with which the unit is associated.

Figure 7:
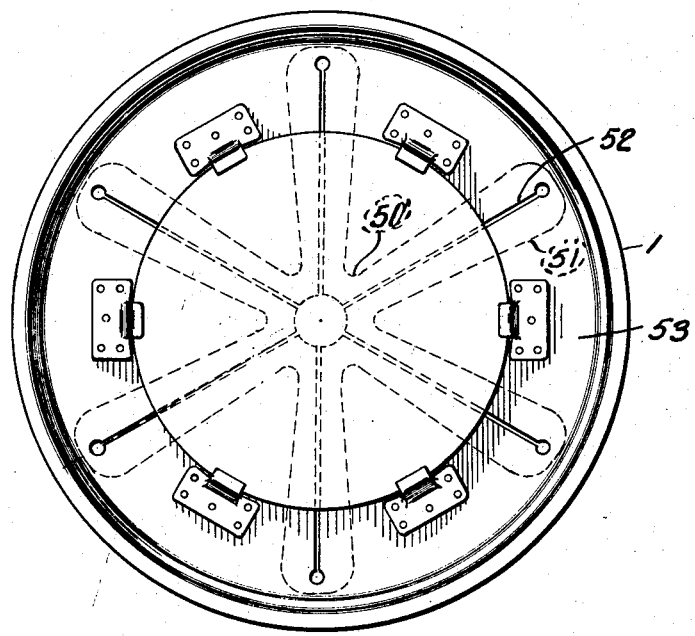
Fig. 7 is a plan view of a unit employing a further modified form of protector.

The form of invention illustrated in Fig. 7 is substantially the same as the forms of the invention previously described but this form includes a protecting element 50 which instead of being disk-shaped has radial tongues 51 of sufficient width to cover the slits 52 in the supporting element 53. This form of the invention reduces the material and weight of the protector so as to better facilitate passage thereof through the opening provided in the supporting element and to reduce hazards that may be caused by complete discharge of the protector under escaping pressure.

Figure 8:
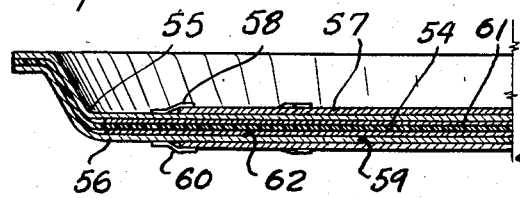
Fig. 8 is a fragmentary section of a safety device constructed in accordance with the present invention and which is used for both pressure and vacuum relief.

The safety device shown in Fig. 8 is for use in relieving both pressure and vacuum. In this form of the invention a sealing element 54 corresponding to the sealing element 22 previously described is contained between inner and outer slotted supporting elements 55 and 56 which correspond to the element 20. The supporting element 55 carries a control disk 57 and lugs 58 as previously described, but the supporting element 56 has the control disk 59 and lugs 60 attached to the opposite face thereof. Protectors 61 and 62 of the type shown in Fig. 4 or 7 are preferably inserted between the slotted elements 55 and 56 and the sealing element 54.

This type unit is mounted between the clamping collars as shown in Fig. 1. When vacuum pressures occur the inner disk 59 and lugs 60 are the controlling factors and when high pressures occur the outer disk 57 and lugs 58 are the controlling factors at which the device functions at the vacuum and pressure conditions respectively.

While the various metal parts of the rupture unit may be formed of non-corrosive metals, the pressure element constructed as described protects them from corrosive elements.

It is also obvious that the pressure sealing elements being of thin, light-weight character may be constructed of any of the precious metals that are not affected by corrosive chemicals.

From the foregoing it is obvious that I have provided a rupture unit which retains normal working pressures but which is adapted to function under relatively low pressure differentials slightly above the working pressures. It is also obvious that the pressure unit is adapted for use in connection with pressure vessels and the like containing corrosive chemicals.

What I claim and desire to secure by Letters Patent is:

1. A safety device of the type for closing a relief passageway for a pressure fluid and adapted to be gripped by a clamping means encircling the relief passageway, said safety device including a support member formed of relatively resilient sheet material having a marginal portion adapted to be gripped between said clamping means and having a substantially flat central portion provided with slots forming therebetween a plurality of yieldable portions bridging the relief passageway, a disk element covering the central portion of the support member on the face side thereof opposite that to be acted upon by the pressure fluid, tabs fixed to said yieldable portions and having tongues overlapping the marginal portion of the disk element to retain the disk element in flat face to face contact with said central portion of the support member up to a given pressure of said fluid, a relatively thin sealing element covering the support member on the pressure side thereof for normally protecting the support member and sealing the slots of said support member to retain the pressure fluid under said given pressure, said disk element cooperating with the yieldable tongues and said yieldable portions of the support member to give way under an increase in pressure above said given pressure to open up the central portion of the support member for release of the sealing element under flow of said pressure fluid, and a protector between the sealing element and the support member and covering said slots to prevent the sealing element from being pushed into the slots incidental to said pressure fluid.

2. A safety device of the type for closing a relief passageway for a pressure fluid and adapted to be gripped by a clamping means encircling the relief passageway, said safety device including a support member formed of relatively resilient sheet material having marginal portion adapted to be gripped between said clamping means and having substantially flat central portion provided with slots radiating from said central portion and terminating short of said marginal portion for forming therebetween a plurality of yieldable portions bridging the relief passageway, a disk element covering the central portion of the support member on the face side thereof opposite that to be acted upon by the pressure fluid, tabs fixed to said yieldable portions and having tongues overlapping the marginal portion of the disk element to retain the disk element in flat face to face contact with said central portion of the support member up to a given pressure of said fluid, a relatively thin sealing element covering the support member on the pressure side thereof for normally protecting the support member and sealing the slots of said supporting element to retain the pressure fluid under said given pressure, said disk element cooperating with the yieldable tongues and said yieldable portions of the support member to give way under an increase in pressure above said given pressure to open up the central portion of the support member for release of the sealing element under flow of said pressure fluid, and a relatively thin protector disk between the support member and the sealing element and radial slots staggered with respect to the slots in the support member to provide yieldable portions covering said radial slots to protect the sealing element.

3. A safety device for closing a relief passageway for a pressure fluid under a normal working pressure and releasable at a given pressure other than the normal working pressure, including clamping means for encircling the relief passageway, pressure release means extending across said passageway and comprising a member of sheet material having a marginal portion gripped by said clamping means and having a substantially flat central area providing normally flat yieldable portions, a sealing diaphragm having a marginal portion also gripped by said clamping means and having a central portion in contact with the flat central area of said member on a face side thereof which is to be acted upon by the pressure fluid to provide a fluid tight seal across said yieldable portions under said normal working pressure, said sealing diaphragm having a yield strength substantially nonresistant to the pressure in said passageway but being able to withstand said working pressure responsive to support thereof by said member, a substantially flat disk member overlapping said substantially flat central area on the face side of said member which is opposite to the side contacted by the sealing diaphragm and acted upon by the pressure fluid, and tabs having portions in attachment to said yieldable portions on the said opposite face side and having tongue portions in overlapping contact with the marginal portion of the substantially flat disk member to maintain face to face contact of said disk member with said yieldable portions under said normal working pressure solely by said overlap of said tongue portions of the tabs with the perimeter of the substantially flat disk, said tongue portion of any one tab being free and independent of the tongue portions of the other tabs and adapted to slide off the marginal portion of the disk member for releasing the disk member upon initial movement of the yieldable portions under said given pressure to open up the passageway for releasing the pressure fluid.

4. A safety device for closing a relief passageway for a pressure fluid under a normal working pressure and releasable at a given pressure other than the normal working pressure, including clamping means for encircling the relief passageway, pressure release means extending across said passageway and comprising a member of sheet material having a marginal portion gripped by said clamping means and having a substantially flat central area providing normally flat yieldable portions, a substantially flat disk member overlapping said substantially flat central area on the face side opposite that to be acted upon by the pressure fluid, tabs having portions in attachment to said yieldable portions on the said opposite face side and having tongue portions in overlapping contact with the marginal portion of the substantially flat disk member to maintain face to face contact of said disk member with said yieldable portions under said normal working pressure solely by said overlap of said tongue portions of the tabs with the perimeter of the substantially flat disk, said tongue portion of any one tab being free and independent of the tongue portions of the other tabs to slide off the marginal portion of the disk member for releasing the disk member when the yieldable portions begin to yield under said given pressure to open up the passageway for releasing the pressure fluid, a sealing diaphragm in backing contact with the release means having a yield strength substantially nonresistant to the pressure in said passageway but being enabled to withstand said working pressure responsive to support thereof by said backing contact with the pressure release means, and a protective element between the sealing diaphragm and said yieldable portions to protect the sealing diaphragm from abrasion by said yieldable portions.

References Cited in the file of this patent

UNITED STATES PATENTS

| | | |
|---|---|---|
| 2,474,826 | Cantlin | July 5, 1949 |
| 2,523,068 | Simpson et al. | Sept. 19, 1950 |
| 2,536,321 | Smith et al. | Jan. 2, 1951 |
| 2,548,744 | Simms | Apr. 10, 1951 |